United States Patent [19]

Piccione

[11] Patent Number: 4,495,581

[45] Date of Patent: Jan. 22, 1985

[54] USER PROGRAMMABLE POSTAL RATE CALCULATOR

[76] Inventor: James M. Piccione, 20958 Upper East Zayante Rd., Los Gatos, Calif. 95030

[21] Appl. No.: 312,530

[22] Filed: Oct. 19, 1981

[51] Int. Cl.³ ........................ G06F 15/20; G06G 19/40

[52] U.S. Cl. .................................... 364/466; 364/567; 177/25

[58] Field of Search ............... 364/466, 567, 571, 478, 364/705; 177/25

[56] References Cited

U.S. PATENT DOCUMENTS

| | | | |
|---|---|---|---|
| 4,122,526 | 10/1978 | Dlugas et al. | 364/705 |
| 4,139,892 | 2/1979 | Gudea et al. | 364/567 |
| 4,180,856 | 12/1979 | Check, Jr. et al. | 364/466 |
| 4,271,470 | 6/1981 | Dlugos et al. | 364/466 |
| 4,286,325 | 8/1981 | Dlugos et al. | 364/466 |

*Primary Examiner*—Errol A. Krass
*Assistant Examiner*—Kevin J. Teska
*Attorney, Agent, or Firm*—Thomas Schneck

[57] ABSTRACT

A calculator for determining postage or shipping fees which has a bus-oriented microprocessor structure having several memories, including a read only memory with programmed quadrangles corresponding to geographic areas represented by the three most significant digits of ZIP codes. This memory allows a computation of a distance-related value to be performed for each shipment between a destination ZIP code and an originating ZIP code. The distance-related value is converted to a zone by means of a look-up table. The zone, as well as a carrier selection, define a piece-wise linear curve to be used for fee calculation. Using an equation related to distance and having weight of a parcel defined by a scale, on which the parcel rests, the shipping fee may be calculated. Once the fee is calculated, special services may be added. The calculator may be changed from a calculating mode to a load mode wherein cost and weight numbers are entered by a user to define the break point or end point of linear segments which make up rate curves for each zone for a particular carrier. Each carrier may have different types of service, all having different rate curves for different zones. All may be defined by means of end points and break points for linear segments or complete straight lines with end points.

14 Claims, 9 Drawing Figures

USER PROGRAMMABLE POSTAL RATE CALCULATOR

DESCRIPTION

1. Technical Field

The invention relates to computing electronic postage scales and more particularly to such a scale having an improved ZIP-to-zone converter and a front panel data input capability.

2. Background Art

Computing electronic postage scales are known. The object of such scales is to place a letter or parcel on a load platform, enter destination data, mode of service, such as regular mail, air mail, parcel post, book rate, express mail or U.P.S., plus any additional services, such as certified mail, with or without return receipt, insurance, etc. Upon entry of such data, the applicable postal or U.P.S. rate is indicated, usually by a display. Some of the internal functions carried out by the devices of the prior art include analog-to-digital conversion of the weight, ZIP-to-zone conversion of the destination and computation of the mailing fee, based on type of service, zone and weight. Many prior art devices rely on programmable read-only memory units (PROMs) for storage of ZIP-to-zone conversion data. In such devices, there is a complete table of all ZIPS, referenced to a point of origin so that a zone is defined for each destination ZIP. The problem with this approach is that the PROM must be custom made for each originating location. Moreover, if the machine is moved, a new PROM must be supplied. In U.S. Pat. No. 4,180,856 to Check, et al. this problem was recognized and zones were computed using subtractive iterations.

Another problem in prior art devices involves storage of fee information based upon weight, zone and class of service. One approach of the prior art is to store all of this data in PROMs and then call up the stored information as needed. In U.S. Pat. No. 4,139,892 Gudea, et al. recognized that the linear nature of postal and U.P.S. fees allows postal rates to be computed for different classes of shipments. In U.S. Pat. No. 4,286,325 Dlugos et al. recognize that postage rates can be computed using boundary conditions for equations.

Prior art reliance on PROMs for tabular rate data for various zones necessarily increases the purchase and operating costs of the equipment, while decreasing the flexibility of the equipment. For example, in most prior art electronic postage scales, the equipment cannot be moved from the originating ZIP code without replacing at least one PROM.

DISCLOSURE OF INVENTION

An object of the present invention is to devise a computing electronic postage scale which does not rely upon PROMs for ZIP-to-zone conversion or for rates based on weight, class of service, and the like, but rather computationally makes a ZIP-to-zone conversion and determines the appropriate charge. Another object of the invention is to devise a computing postal scale wherein rate break points and boundary conditions may be loaded into the device by a user without physically changing memory units.

The above object has been met with a postage calculator which features a new ZIP-to-zone converter. The conversion approach includes memory units which store X, Y coordinates of grid quads, the quads forming a map of a geographic area. Each quad generally corresponds to the geographical area represented by the most significant digits of ZIP codes. By specifying destination and originating ZIP codes a coordinate X, Y pair may be easily looked up in the memory units. The geographic distance between the coordinate pair may be computed, or, alternatively, a value which is distance related, such as the square of the distance may be used. Another stored set of data includes ranges of distance related values corresponding to each postal zone. Once a distance related value is computed, a range which includes that value is identified. Such a range is associated in the memory unit with a postal zone.

Also stored in a memory unit are postal rate function break points, which are endpoints of line segments forming a piecewise continuous postage rate line for each zone. The lines define postal rates as a function of weight for continuously increasing weights up to a limit. An electronic scale is used to weigh an item needing postage and to generate an electrical signal representing weight. A front panel allows entry of the destination ZIP, carrier, type of service and special requirements, such as insurance. The calculator converts the weight signal to postage by using a postage rate line for the appropriate zone.

The front panel also allows programmability of break points without physically changing PROMs or other memory units. As postage rates change, break points can be reset. Different size zones for different carriers may also be set on the panel by electrically reprogramming the memory units. For example, postal zones may differ from zones used by private courier services or by U.P.S.

The system of the present invention provides increased flexibility in determining postage, without a need for replacement of read only memory units as postal rates and zones change.

Figure 2:
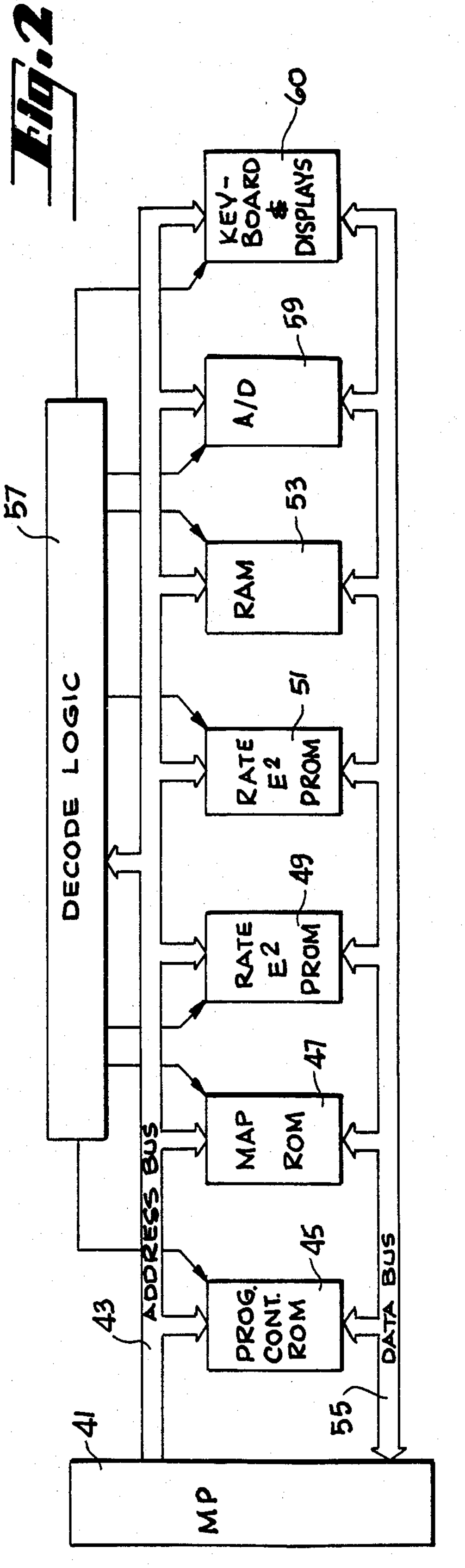
FIG. 2 is an electrical plan of the postal rate calculator shown in FIG. 1.

FIGS. *7a*, *7b* and 8 are flow diagrams for postal rate calculator shown in FIG. 2.

BEST MODE FOR CARRYING OUT THE INVENTION

Figure 1:
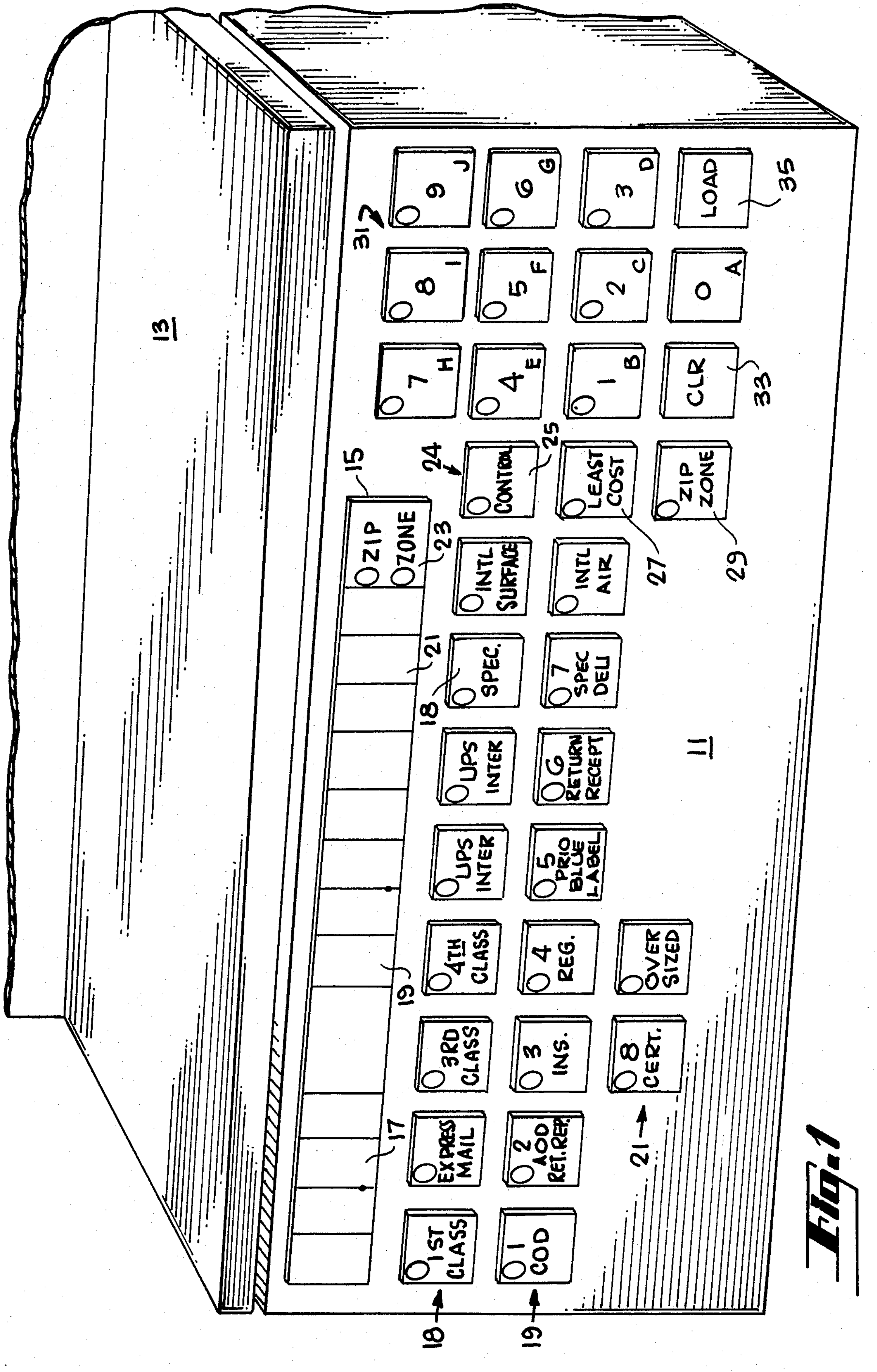
FIG. 1 is a perspective view of the exterior cabinet of a postal rate calculator of the present invention.

With reference to FIG. 1, a cabinet 11 is shown, housing the postal rate calculator of the present invention. The housing contains a scale, having a pan 13 for supporting items to be weighed. The scale is preferably an electronic, commercially available scale. Downward forces on pan 13 are sensed by a transducer which produces an electrical signal indicative of weight. Cabinet 11 also includes a visual display 15 having four sections, including section 17 for indicating cost in dollars and cents, or similar decimal currency, a section 19 for indicating weight in convenient units. To the right is a section 21 which indicates the three most significant digits of a destination ZIP code, or alternatively a single digit, indicative of a postal zone. Lastly, section 23 has ZIP and zone indicators, such as lights, for displaying whether the number in display section 21 is a ZIP code or a zone. This section is not necessary, since three digits indicate a ZIP code, while only one digit indicates a zone. However, since this may be subject to change, the indication is provided.

Immediately below visual display 15 is a keyboard having three horizontal row of push buttons. Each button is a switch of the illuminated type so that the condition of the switch may be seen. The first horizontal row 18, excepting the last button, indicates carrier functions. Various mail and parcel handling carriers are indicated. Each carrier has a separate rate structure, so it is important to specify the carrier so that the corresponding rate structure can be accessed in memory of the calculator, as explained below. The second and third horizontal rows of buttons 19 and 21, excepting the last buttons in each row, pertain generally to add-on costs, such as insurance and registration. These add-on costs are applicable after the basic charge has been calculated. A vertical row of buttons 24 allows special computer functions to be implemented. For example, the control switch 25 serves to terminate an operation and reset the calculator for beginning the same or a different operation. The least-cost switch 27 requires the calculator to determine rates for all carriers and indicate the carrier having the lowest charge for the weight of the item in the scale pan. The ZIP-zone switch 29 is used when a zone is known, so that the normal calculator sequence, involving a zone computation, based on ZIP, is not required. This will be explained in more detail below.

To the right of the three rows of function buttons is an alphanumeric keypad 31, plus clear switch 33 and load switch 35. The clear switch 33 serves to clear a register where numeric entries are first stored. Load switch 35 is used to initiate entries to memory, as well as to initiate a load mode of operation, as described below. Each of the keys in the keypad 31 is of the lighted switch type, so that a user can ascertain whether a switch has been activated upon depression of a particular key.

With reference to FIG. 2, the electronic structure of the present invention is indicated. The overall architecture is bus oriented about a standard commercially available microprocessor 41. Connected to the microprocessor via address bus 43 and data bus 55 are several memory units including a program control memory 45, which is a read only memory or ROM. This memory controls the front panel, as well as containing instructions for calculations involving weight versus cost, based on destination. This data is further described below with reference to FIG. 6.

Figure 5:
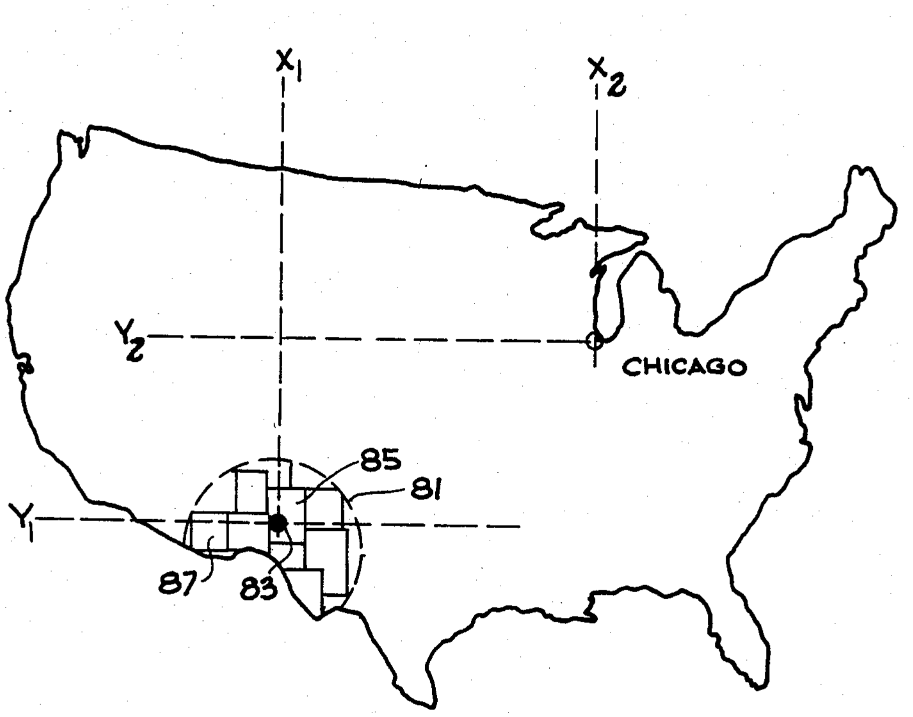
FIG. 5 is a map of the United States illustrating ZIP-to-zone conversion.

Memory unit 47 is a ROM, also connected to microprocessor 41 via the address bus 43 and data bus 55. This ROM contains a binary zone map, for example, the zone map described below in relation to FIG. 5. A map is digitized, with map quadrangles or quads corresponding to the three most significant ZIP digits.

Memory unit 49 is an electrically erasable, programmable read only memory, $E^2$PROM which is similarly connected to microprocessor 41. This memory unit stores the three most significant digits of a user's own location, plus break points for all rates of all carriers, as illustrated by the curves in FIG. 6 and discussed below.

Memory unit 51 is another $E^2$PROM which serves the same function as memory unit 49 and provides extra capacity. Memory unit 53 is a random access memory which is used by microprocessor 41 for temporary storage of intermediate results as the microprocessor proceeds through steps of a program or a computation.

Also connected to the microprocessor are input and output devices, as well as auxiliary devices for the input and output devices. For example, decode logic 57 is used for converting digital information into segments suitable for display, in much the same way that decoding circuitry in an electronic digital watch operates a visual display. An analog-to-digital converter 59 is used for converting electrical weight signals into binary form for computing purposes. The various input-output devices, such as the keyboard and the displays are all indicated by block 60 and are similarly connected to microprocessor 41. These input-output devices are described with further reference to FIGS. 3 and 4.

Figure 3:
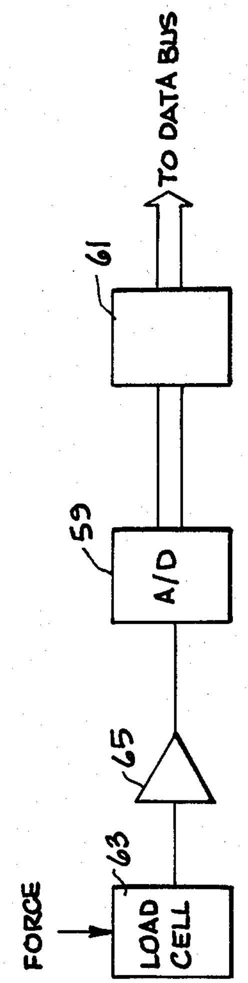
FIG. 3 is an electrical plan for parcel weight input signals to the device shown in FIG. 2.

In FIG. 3, a load cell 63 is shown having force applied in the direction of the arrow, usually gravitational force supplied by an item placed on the scale pan. Load cell 63 produces an analog signal which is amplified by amplifier 65 and then transmitted to analog-to-digital converter 59. A multi-bit digital signal is produced which is transmitted to a sample and hold circuit 61, which may be considered as part of the converter, where data is accumulated until called for by the microprocessor on the address bus 43 shown in FIG. 2. The weight signal is then applied to data bus 55 and sent to the microprocessor for a numeric or control operation.

Figure 4:
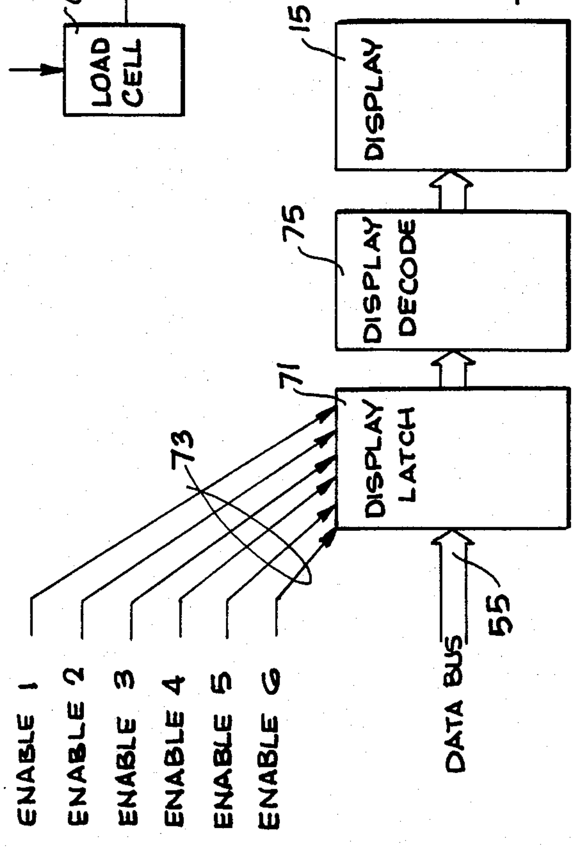
FIG. 4 is an electrical plan for output signals from the device shown in FIG. 2.

With reference to FIG. 4, a data output subsystem may be seen. Output data arrives via data bus 55 into a display latch 71 where data to be displayed is held in storage registers until gated out by an appropriate enable line, namely one of the enable lines 73. The six enable lines 73 are each associated with a parameter to be displayed, such as cost, weight, ZIP, zone and certain other parameters which may be optionally displayed, such as time of day and alarm set. The latter two parameters would require front panel controls, but for simplicity have been omitted from FIG. 1. Once enabled, data is transmitted to display decoder 75 wherein digital signals are converted to appropriate segments for forming numbers in the usual way in various sections of visual display 15.

One of the novel features previously mentioned is a ZIP-to-zone converter wherein only the first three digits of a destination ZIP code are entered into the front panel of cabinet 11. The first three digits are the most significant digits and indicate a geographical area which covers at least several acres and usually a minimum of a few square miles, such as a township. From the destination most significant ZIP digits and from the same digits associated with the originating ZIP, the rate calculator of the present invention is able to compute a zone by reference to a map programmed into a memory means, such as the read only memory unit 47 in FIG. 2. This memory unit contains a digitized map of a geographic area, such as a map of the United States illustrated in FIG. 5. This figure shows a shipping point of origin which is exemplified by Chicago. The destination ZIP is in eastern New Mexico a rural area where ZIP codes encompass relatively large geographic areas. Such areas are indicated by the dashed circular line 81 and the destination address is indicated by the point 83 within a quadrangle, or quad, 85 which symbolizes the geographic area covered by the three most significant digits of the ZIP code of the destination address. Other quads within circle 81, such as quad 87, symbolize other geographic areas within the United States wherein the geographic area represented by the quad approximately corresponds to the three most significant digits of the ZIP code. Quads are selected so that quad boundaries may be represented by four X, Y coordinates. Thus, with every destination ZIP code, there is a corresponding quad in the map associated with the three most significant ZIP digits. The calculator has a sub-routine for computing the centroid of the quad of the destination address and has previously determined the centroid of the quad for the originating address. Then, by using the distance formula for two different X, Y locations, the distance between the two points may be computed. Since the formula involves a square root, the square of the distance is a preferred parameter, to conserve computing time. The preferred formula is:

$$Z^2=[(X_2-X_1)^2+(Y_2-Y_1)^2]$$

where $Z^2$ is the distance squared and $X_1$, $Y_1$ are the coordinates of the centroid of the originating quad while $X_2$, $Y_2$ are the corresponding coordinates of the destination quad. Once the distance parameter, $Z^2$, has been computed, the appropriate zone has thus been defined.

The electrically erasable memory, $E^2$PROM 49 in FIG. 2, stores the most significant digits of the originating ZIP code and supplies these digits for map conversion to a centroid location on each computation. The same memory device stores ranges of distance related values corresponding to each postal zone. The reason that distances themselves are not used is because, as mentioned previously, it is easier to compute the square of the distance and so the distance related values corresponding to postal zones would be the squares of the distances. For example, if zone 2 is defined as a distance 400 to 600 miles away, the corresponding distance values which would be stored would be 1,600 and 3,600. When a user enters the most significant digits of a destination ZIP code a control unit causes the microprocessor of FIG. 2 to convert both the originating and destination ZIP codes into corresponding X, Y coordinates, representing map quad centroids in order to compute a value for the previously mentioned distance function. This identifies a postal zone since the computed value will be within a range of distance related values. For example, if the computed value is between 1,600 to 3,600, zone 2 would be identified.

Figure 6:
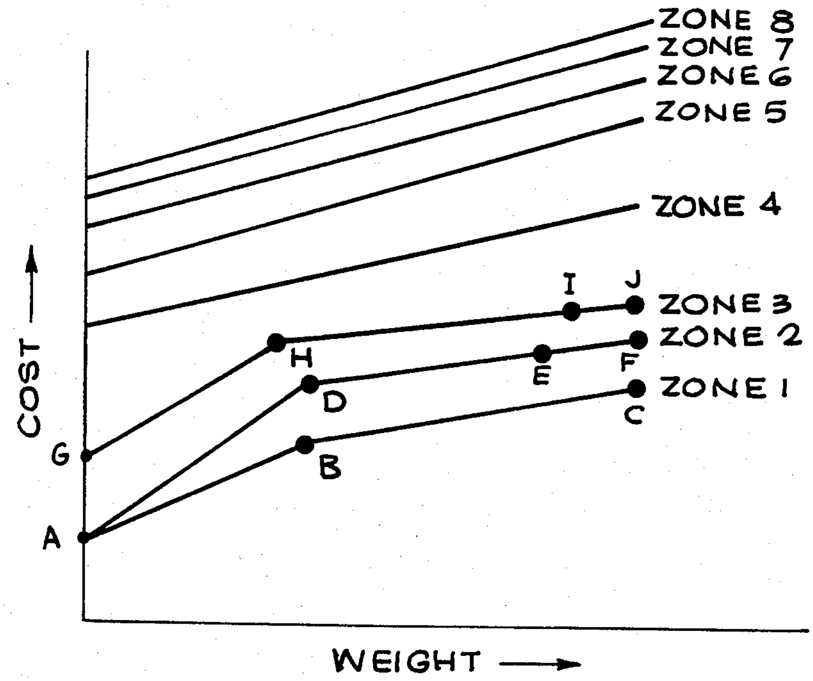
FIG. 6 is a series of plots illustrating cost versus weight curves for different zones.
Figure 7A:
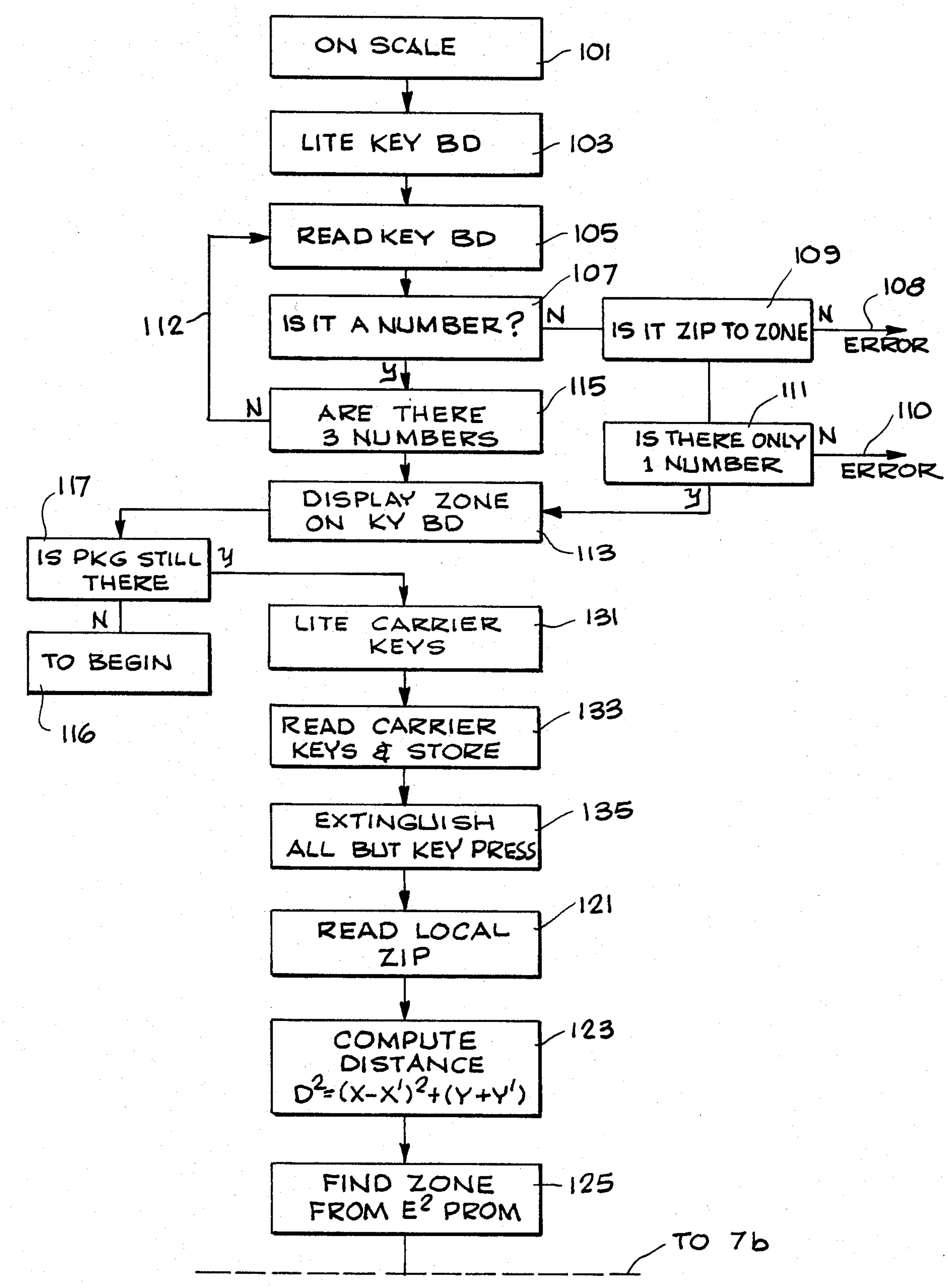
Figure 7B:
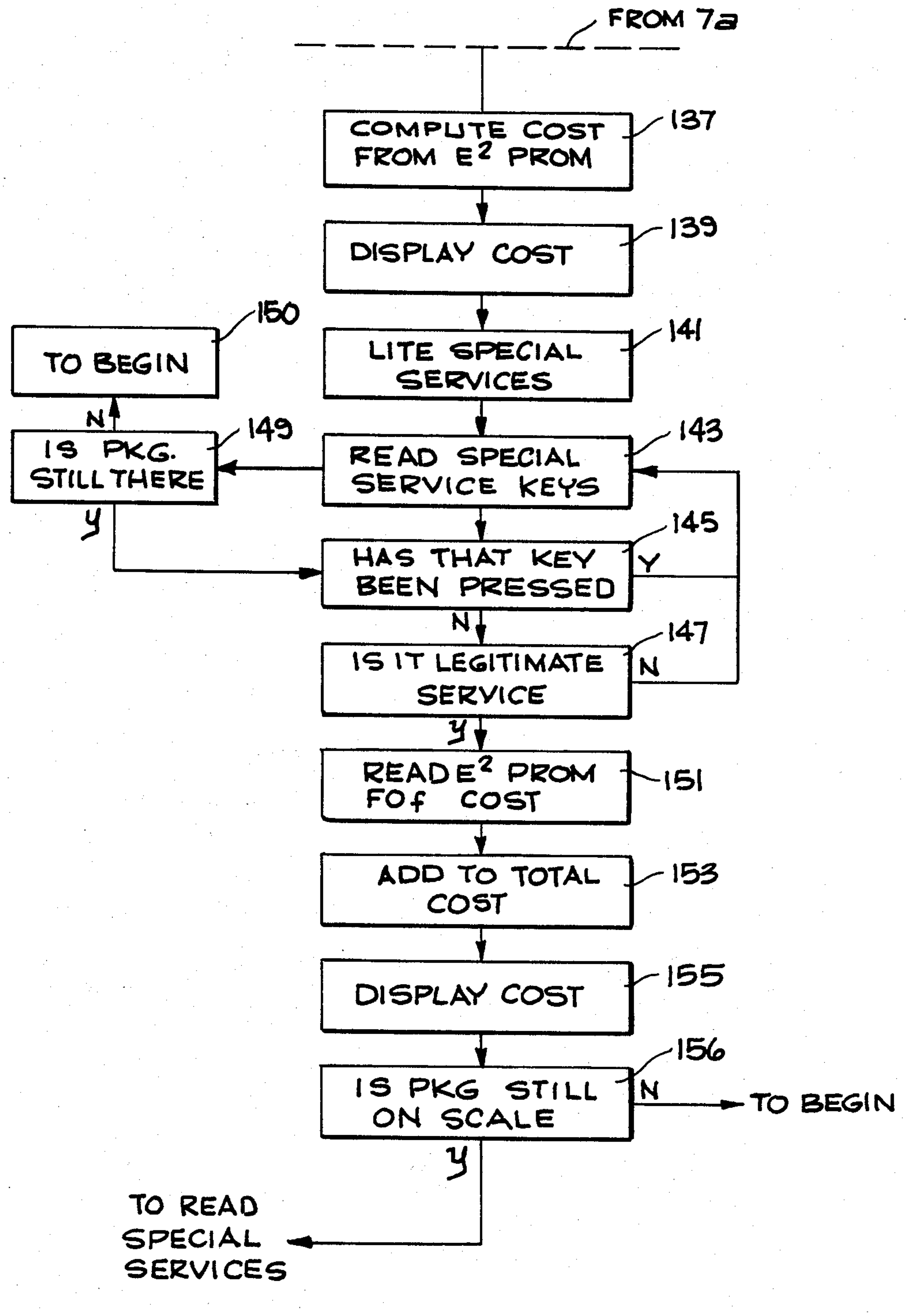

The basic postage or shipping rate is determined by use of the fact that rates are either linear or can be approximated by piecewise linear segments. In FIG. 6, curves for eight shipping zones are shown. These zones may correspond to the same eight zones which are used by the U.S. postal service, or by United Parcel service or any transportation company. The curves are hypothetical and do not represent actual curves used by any transportation company. The curves of FIG. 6 are not stored in memory, per se. Rather, the equation for a straight line is stored in memory and break points for linear line segments are also stored. For example, the FIG. 1 curve requires break points A, B and C to be stored to define the zone 1 curve. The zone 2 curve is defined by points A, D, E and F. Similarly, the zone 3 curve is defined by points G, H, I and J. It is easier to store break points defining linear piecewise segments which define a curve than a table of many points for various weights. It may be seen that by applying the formula for a straight line for a selected zone, cost of shipment may be determined as a function of weight.

Since a weight signal is presented by load cell 63, base cost may be determined. After base cost is determined, the cost of any special services, such as insurance is added to the base cost to determine a final shipping fee or postage. The break points of FIG. 6 would be repeated for each different carrier. For example, UPS has a different set of weights and break points than the postal service, but in general they may be defined by piecewise linear segments, analogous to those in FIG. 6. Similarly, the U.S. postal service has priority mail rates, second class, third class and fourth class rates, all of which can be defined by line segments, as in FIG. 6.

With reference to FIGS. *7a* and *7b*, a flow chart of operations for the postal rate calculator of the present invention is indicated. Operations are initiated by placing a package on the scale pan, as indicated in block 101. This causes lights of the front panel keyboard to light, including carrier functions, special services and the numeric keypad. This is indicated in block 103. Proceeding to block 105, the microprocessor under the program control reads which button switches have been pushed on the keyboard, defining a carrier function, plus special services. It also reads the numeric keyboard to determine whether a ZIP number or a zone has been pushed. This is indicated in block 107 and if a single digit appears, the question resolved in block 109 is whether a zone number has been entered by pushing ZIP-zone button 29 in FIG. 1. If this button has not been pushed and a single digit is pushed on the key pad, an error is signaled on line 108. However, if a zone has been indicated, the operation proceeds to block 111 where there is a confirmation of only one number which defines a zone. There could be more than one number to define a zone, but using the example of FIG. 6, only eight zones are defined, so only one number between one and eight should appear. If this is the case an appropriate zone has been signaled and this fact is transmitted to block 113. On the other hand, if there is more than one number which has been pushed on the keyboard for a zone number an error signal is generated along line 110. If three numbers have been entered these are taken as the three most significant ZIP digits of a destination in function block 115. If there is more than a single digit which has been entered, but not three digits, namely two digits, the keyboard awaits entry of a third digit. Upon receipt the microprocessor then seeks confirmation that the package is still there as indicated by decision block 117 and, if not, the apparatus is reset, as indicated by block 116. If the package is still there, the calculator proceeds to determine which carrier has been selected by prompting carrier selection. This is done by lighting the carrier keys, as indicated by block 131. The selected carrier keys are read, as indicated in block 133 and all keys are extinguished, except those depressed, as indicated in block 135. A ZIP-to-zone computation, using the internal map is then carried out, indicated by blocks 121, 123 and 125, deriving a destination zone which is then transmitted to the display. The computer now uses rate information, for the given zone and computes the basic cost of shipping for the carrier selected. With reference to FIG. *7b*, this is indicated by block 137 and block 139 where the basic cost is displayed. Next, add-on services are selected and the special service keys are lit, as indicated in block 141. All of the special service keys are read, searching for all special services which have been selected for a particular carrier. This operation is indicated by blocks 143, 145 and 147, while block 149 seeks verification that the original package is still in place by checking the scale. If the package is not there, the entire operation is terminated and the apparatus is reset for beginning a new operation, indicated by block 150. At this point, the special services have been determined and added to the basic cost, as indicated by blocks 151 and 153. The total cost is then displayed as indicated in block 155. Usually, the package would be removed from the scale once the total cost is displayed, as indicated by block 156. If not, the calculator returns to block 143 to determine if further special service keys are to be selected which would increase the total cost of shipping. This subroutine is terminated when the package is removed from the scale pan.

One of the distinguishing features of the present invention is the ability of a user to program rates, once rates are promulgated by a transportation company, such as the U.S. postal service, which in recent years, has had frequent rate changes. Rather than providing new PROMs, the present invention allows the numeric keyboard to be used for entry of break points defining the linear segments for various zones, illustrated in the example of FIG. 6. The programming sequence for break point setting is illustrated in the flow chart of FIG. 8.

Figure 8:
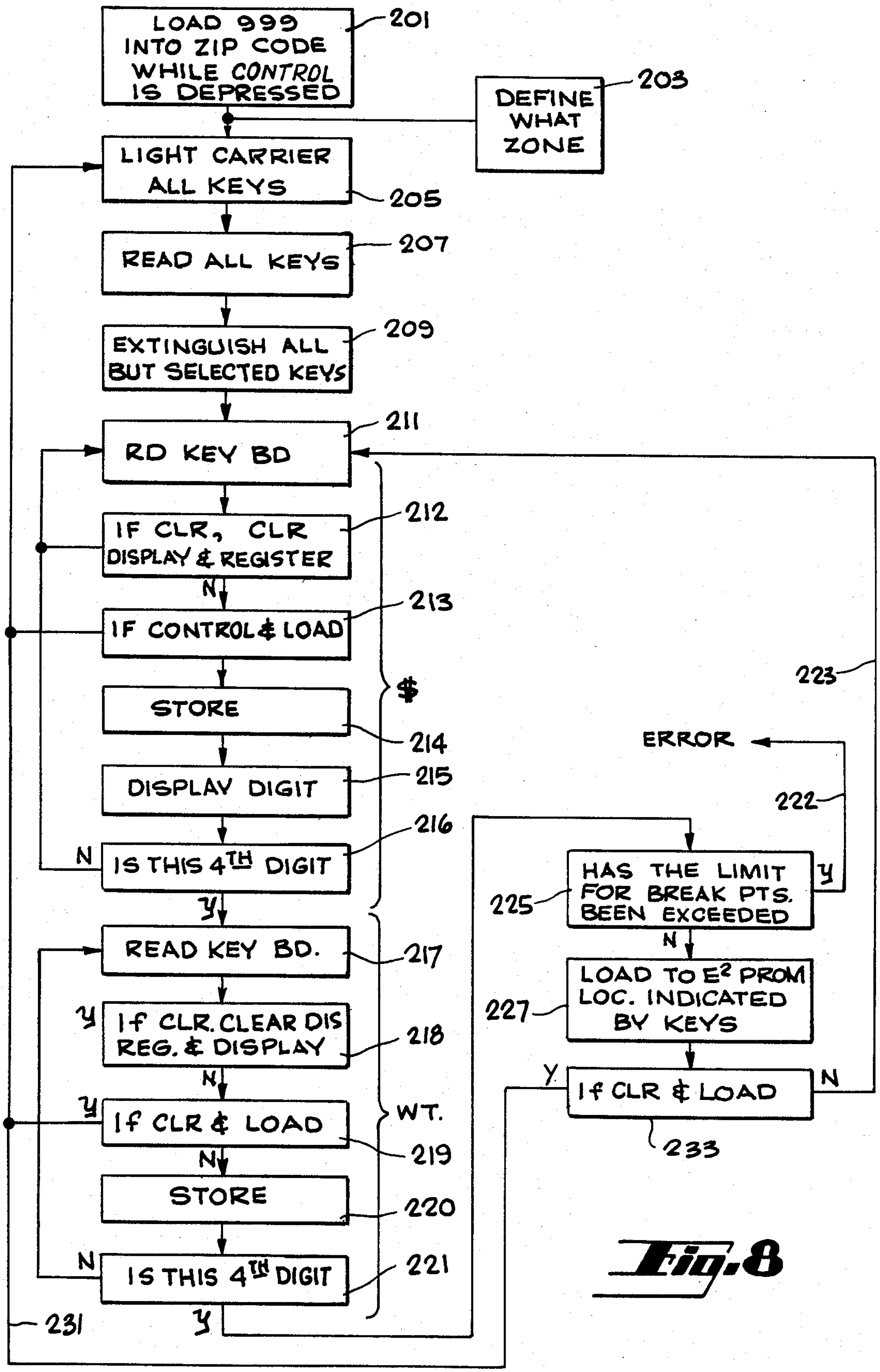

With reference to FIG. 8, loading of break points is initiated by a special command, such as depression of ZIP code 999 while the control button 24 is depressed. This is indicated by block 201. This causes the microprocessor to recognize the load mode of operation, rather than the postage determining operation. Next, a zone is defined by a subroutine initiated by pushing an identifying button, such as the ZIP-zone button 29 and entering a zone number, as indicated by block 203. This would define one of the several curves of FIG. 6. The next sequence of operations determines the carrier to be defined. In blocks 205, 207 and 209 all carrier lights are lit. All keys are read and then all lights are extinguished, except the selected carrier key. The selected carrier is then defined and memory units are set for entry of dollar values and weights which form coordinates for end points of line segments, in turn forming the curves of FIG. 6. In other words, dollar values and weights define break points and end points for rate curves. In blocks 211–216, the dollar values are entered in the usual way. The keyboard is first read, the dollar value stored and the value displayed. Similarly, in blocks 217–221 weights are read. The sequence may be repeated by looping along line 223 until all break points have been defined, or the number of break points which memory is capable of storing has been exceeded. In the case where memory is exceeded block 225 signals an error along line 222. All break points are loaded into memory, as indicated by block 227. After the number of break points for one carrier has been established, break points are established for the next carrier by looping back along line 231, after a signal from block 233.

One of the advantages of loading break points in the manner described is that a user may have an uncommon shipper for which no programmable read only memory is available. For example, a shipper may use a local courier service or an employee whose costs and travel expenses are distance related. Estimates of such private services may be computed, based on ZIP codes, using the calculator of the present invention, by depressing the "special" button 18 at the right-hand end of row 17 in the front panel of cabinet 11, shown in FIG. 1, providing the user has entered curves into memory, similar to those of FIG. 6, for the private services. Using the postal rate calculator of the present invention, a user will have both lower operating costs, because the need to replace PROMs is obviated, as well as a simplified hardware structure, since the amount of memory required to store multiple rate tables is also obviated.

I claim:

1. An improved ZIP to zone converter for a postal scale or the like comprising, first memory means containing a representation of a map of a geographic area, said area being divided into an irregular grid quad pattern, with grid quads generally corresponding to the geographic areas represented by the most significant digits of ZIP codes, each grid quad having X, Y digital coordinates, said first memory means for storing the X, Y digital coordinates of said grid quads, second memory means for storing the most significant digits of an originating ZIP code and for storing ranges of distance related values corresonding to each postal zone, third memory means for storing control information, data entry means for entering the most significant digits of a destination ZIP code, microprocessor means connected to a data bus, said first, second and third memory means and said data entry means connected to the microprocessor means via the data bus for converting the most significant digits of both the originating and destination ZIP codes into X, Y coordinates, computing a value for a distance function of the X, Y coordinates which identifies one of said ranges of distance related values and identifying the postal zone corresponding to said value.

2. The apparatus of claim 1 wherein said second memory means is erasable.

3. The apparatus of claim 1 wherein said microprocessor means computes a value for the distance function $Z^2$ where $Z^2=[(X_2-X_1)^2+(Y_2-Y_1)^2]$ where ($X_1$, $Y_1$) and ($X_2$, $Y_2$) are the X, Y digital coordinates of the centroids of the respective originating and destination grid quads.

4. The apparatus of claim 1 wherein said first memory means is a read only memory.

5. The apparatus of claim 1 wherein one of said memory means also contains postal rate breakpoints which are the endpoints of line segments forming a continuous line for each zone, said line segments defining postal rates as a function of weight for continuously increasing weights up to a limit, said computer means selecting the appropriate line for an identified postal zone.

6. The apparatus of claim 5 wherein the data entry means is adapted for entry of said break points.

7. An apparatus for determining postage for an item comprising, a data bus, first memory means connected to the data bus for storing digits from a binary coded postal zone map of a geographic area having an irregular grid pattern, with grid quads generally corresponding to the geographic area represented by the most significant digits of ZIP codes, each grid quad being specified by X, Y digital coordinates forming said stored digits, second memory means connected to the data bus for storing the most significant digits of an originating ZIP code and storing postal rate function break points which are endpoints of line segments forming a postage rate line for each zone, said rate line defining postal rates as a function of weight for continuously increasing weights up to a limit, and for storing ranges of distance related values corresponding to each postal zone, third memory means connected to the data bus for storing control information, fourth memory means connected to the data bus for storing computed results, data entry means connected to the data bus for entering a destination ZIP code, microprocessor means having as an electrical input an item weight signal and connected to the data bus for computing a distance related value between an X, Y digital coordinate corresponding to a destination ZIP code and an X, Y digital coordinate corresponding to an originating ZIP code, said distance within one of said ranges of distance related values, and identifying the postal zone corresponding to said range, then computing postage based on a rate line for the identified zone and said weight signal, and storing computed results in said fourth memory means, and output means connected to the data bus for converting the postage computation to an electrical signal suitable for external use.

8. The apparatus of claim 7 wherein said second memory means is erasable.

9. The apparatus of claim 7 wherein said microprocessor means computes a value for the distance function $Z^2$ where $Z^2=[(X_2-X_1)^2+(Y_2-Y_1)^2]$ where $(X_1, Y_1)$ and $(X_2, Y_2)$ are the X, Y digital coordinates of the centroids of the respective originating and destination grid quads.

10. The apparatus of claim 7 wherein said first memory means is a read only memory.

11. The apparatus of claim 7 wherein the data entry means is adapted for entry of said break points.

12. A method for converting ZIP to zone for a postal rate determination comprising, assigning X, Y coordinates to each quad of a grid pattern forming a map of a geographic area, the quads generally corresponding to the geographic areas represented by the most significant digits of ZIP codes, storing in a memory unit X, Y coordinates of two quads corresponding to the most significant digits of destination and originating ZIP codes, storing in the memory unit ranges of distance related values corresponding to each postal zone, computing a distance between the X, Y coordinates of said two quads, and identifying the postal zone corresponding to said distance.

13. The method of claim 12 wherein said value for the distance function is computed in accord with the equation $Z^2=[(X_2-X_1)^2+(Y_2-Y_1)^2]$ where $(X_1, Y_1)$ and $(X_2, -Y_2)$ are the X, Y digital coordinates of the centroids of the respective originating and destination grid quads.

14. A method of determining postage for an item comprising, assigning X, Y coordinates to each quad of a grid pattern forming a map of a geographic area, the quads generally corresponding to the geographic areas represented by the most significant digits of ZIP codes, storing in a memory unit X, Y coordinates of two quads corresponding to the most significant digits of destination and originating ZIP codes, storing in the memory unit ranges of distance related values corresponding to each postal zone, computing a distance between the X, Y coordinates of said two quads, identifying the postal zone corresponding to said distance, storing in a memory unit postal rate function break points which are endpoints of line segments forming a postage rate line for each zone, said rate line defining postal rates as a function of weight for continuously increasing weights up to a limit, weighing an item needing postage and deriving an electrical signal representing the item weight, using said electrical signal representing weight, together with the identified postal zone for selecting a corresponding postage rate line, and electrically converting the weight signal to postage using said rate line.

* * * * *